(12) United States Patent
Hernacki et al.

(10) Patent No.: US 9,130,962 B2
(45) Date of Patent: Sep. 8, 2015

(54) CALCULATING DOMAIN REGISTRAR REPUTATION BY ANALYSIS OF HOSTED DOMAINS

(75) Inventors: Brian Hernacki, Mountain View, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 2063 days.

(21) Appl. No.: 12/164,751

(22) Filed: Jun. 30, 2008

(65) Prior Publication Data

US 2009/0328224 A1 Dec. 31, 2009

(51) Int. Cl.
*G06F 11/00* (2006.01)
*H04L 29/06* (2006.01)

(52) U.S. Cl.
CPC .......... *H04L 63/105* (2013.01); *H04L 63/1433* (2013.01)

(58) Field of Classification Search
USPC .......................................................... 726/25
See application file for complete search history.

(56) References Cited

U.S. PATENT DOCUMENTS

| 2006/0031315 | A1* | 2/2006 | Fenton et al. ................ 709/206 |
| 2006/0168041 | A1* | 7/2006 | Mishra et al. ................ 709/206 |
| 2006/0212925 | A1* | 9/2006 | Shull et al. ....................... 726/1 |
| 2006/0253584 | A1 | 11/2006 | Dixon et al. |
| 2008/0082662 | A1 | 4/2008 | Dandliker et al. |

OTHER PUBLICATIONS

PCT International Search Report and Written Opinion for Application PCT/US09/49105 dated Aug. 19, 2009.

* cited by examiner

*Primary Examiner* — Dede Zecher
(74) *Attorney, Agent, or Firm* — Brill Law Office; Jeffrey Brill

(57) ABSTRACT

Reputations of domain registrars are calculated based on the hosting of risky domains. The more undesirable domains a registrar hosts, the lower is its reputation. The risk level of the hosted domains is also a factor in determining the reputation. When a user attempts to access a hosted domain, the calculated reputation of the hosting domain registrar is used in determining what security steps to apply to the access attempt. The worse the reputation of the hosting registrar, the more security is applied, all else being equal.

17 Claims, 2 Drawing Sheets

CALCULATING DOMAIN REGISTRAR REPUTATION BY ANALYSIS OF HOSTED DOMAINS

TECHNICAL FIELD

This invention pertains generally to computer security, and more specifically to using the reputation of a domain registrar to provide guidance as to what level of security analysis to apply to interactions with a hosted domain.

BACKGROUND

The use of the internet has become ubiquitous. Unfortunately, as internet use has spread, so has the use of the internet for the distribution of viruses, spyware, hosted advertising programs, and other unwanted software. When attempting to connect to a new service (e.g., website, URL, etc.), there are a number of analysis methods that can be used to determine how safe the remote target is. However, the more effective the method, generally the more expensive it is to apply in terms of latency and computing resource usage. The most risky sites certainly merit the use of the most effective methods despite the cost, but it would be appropriate to apply less expensive security checks to many safer sites. Unfortunately, it can often be difficult to determine which level of security analysis to employ to which target without detailed contextual information. It would be desirable to address this shortcoming.

SUMMARY

Reputations of domain registrars are calculated based on the hosting of risky domains. The more undesirable domains a registrar hosts, the lower is its reputation. The risk level of the hosted domains is also a factor in determining the reputation. When a user attempts to access a hosted domain, the calculated reputation of the hosting domain registrar is used in determining what security steps to apply to the access attempt. The worse the reputation of the hosting registrar, the more security is applied, all else being equal.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
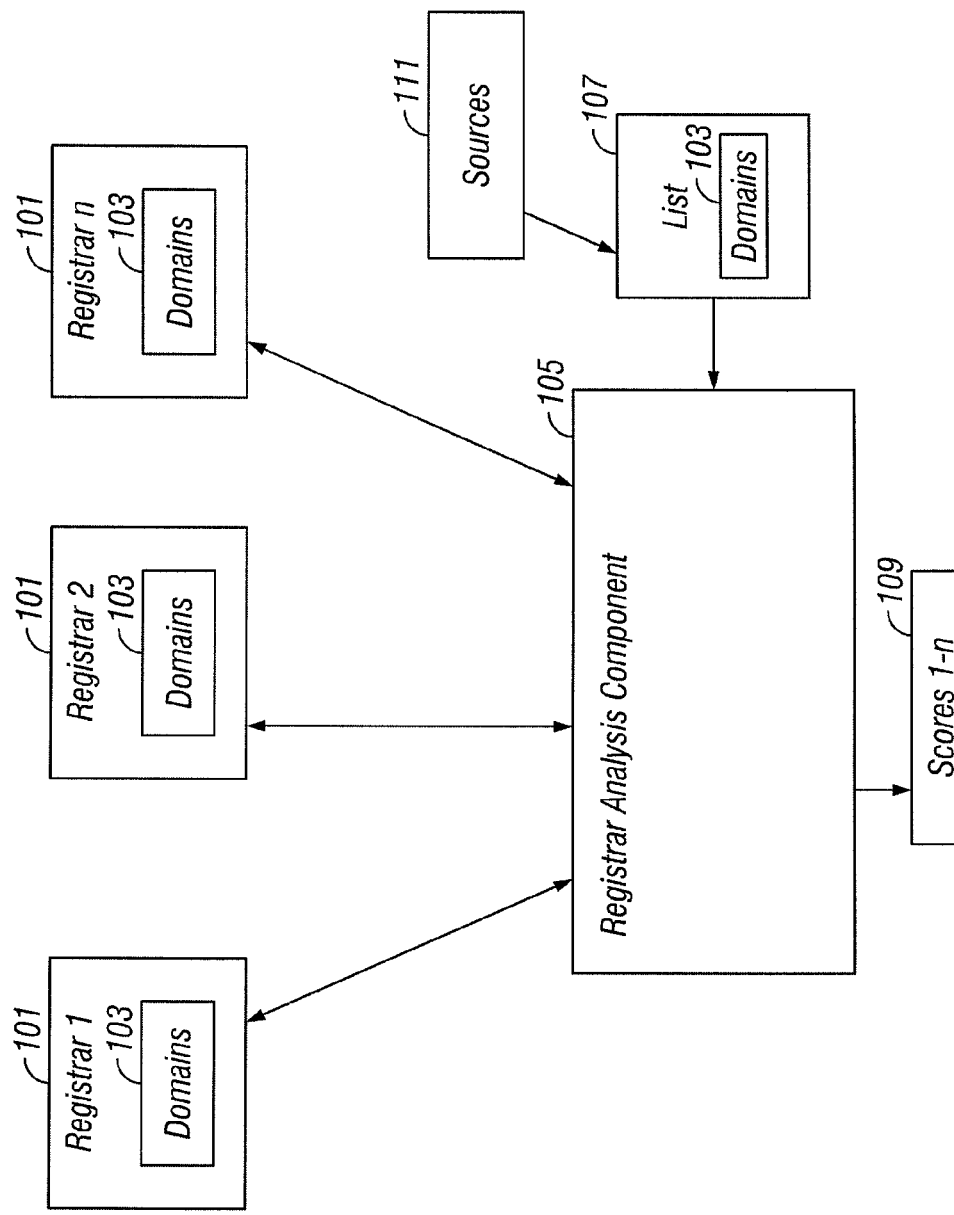
FIG. 1 is a block diagram illustrating calculating the reputation of a domain registrar based on an analysis of its hosted domains, according to some embodiments of the present invention.

FIG. 1 illustrates a system for calculating the reputational score 109 of a domain registrar 101 based on an analysis of its hosted domains 103, according to some embodiments of the present invention. It is to be understood that although various components are illustrated and described above as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a registrar analysis component 105 maintains a list 107 of common risky, fraudulent and otherwise undesirable domains 103. The contents of this list 107 can come from a variety of sources 111, such as known blacklists, spam detection software, phishing detection software, security software, and all other methods for collecting or identifying suspicious domains (e.g., identification of domain 103 names with typo variants). The registrar analysis component 105 keeps the suspicious domain list 107 current in real time, by periodically updating the list from the sources 111.

The registrar analysis component 105 maintains a reputational score 109 (i.e., a riskiness score) for each registrar 101 that hosts at least one domain 103 on the list 107. More specifically, the registrar analysis component 105 identifies the hosting registrar 101 for each domain 103 on the list 107, and adjusts the reputational score 109 of the that registrar 101 based on the risk level of the hosted domain 103. In a simple example, the registrar analysis component 105 can assign domains 103 a risk level of, e.g., 1 to 10. For example, 10 could represent the most risky domains 103 (those associated with malware, CSS attacks, etc.), 5 could represent less virulent but still fraudulent domains 103 (e.g., those hosting spam sites), and 1 could indicate the least bad of the undesirable domains 103 (e.g., hosted ads). It is to be understood that the specific methodology used to calculate risk levels of domains 103 is variable design parameter. The registrar analysis component 105 can apply any weighting factors to distinguish between types of suspicious sites 103 deemed appropriate.

Turning now to the reputational scores 109 of domain registrars 101, the registrar analysis component 105 can initially assign each registrar 101 a neutral score, e.g., 0. As the registrar analysis component 105 determines the hosting registrars 101 of individual suspicious domains 103, the registrar analysis component 105 can adjust the reputations 109 of the hosting registrars 101 accordingly. Generally, the more domains 103 of higher risk levels hosted by a given registrar 101, the more risky the registrar 101 is scored as being. For example, in a weighing scheme in which malware is adjudicated as having a higher risk factor than spam, hosting 10,000 malware sites 103 would typically result in a score 109 indicating more risk than hosting 10,000 spam sites 103, whereas hosting 10,000 spam sites 103 would typically result in a score 109 indicating more risk than hosting 5,000 spam sites 103, all other factors being equal.

It is to be understood that the specific methodology used to calculate reputational scores 109 of domain registrars 101 is a variable design parameter. In one embodiment, the registrar analysis component 105 can simply calculate the reputation 109 of a hosting registrar 101 as the average risk level of all hosted risky domains 103, with some tuning for minimum sample size. The registrar analysis component 105 can apply any weighting factors in calculating the reputational score 109 deemed appropriate. Other factors that can be included in the calculation of the final score 109 are, for example, a quantifiable evaluation of the given registration process used by the registrar 101, percent of risky domains 103 as total of those hosted, etc. In any case, each registrar 101 is assigned a reputation score 109, which is adjusted in real time as new samples are seen, new evaluations are made, etc.

Figure 2:
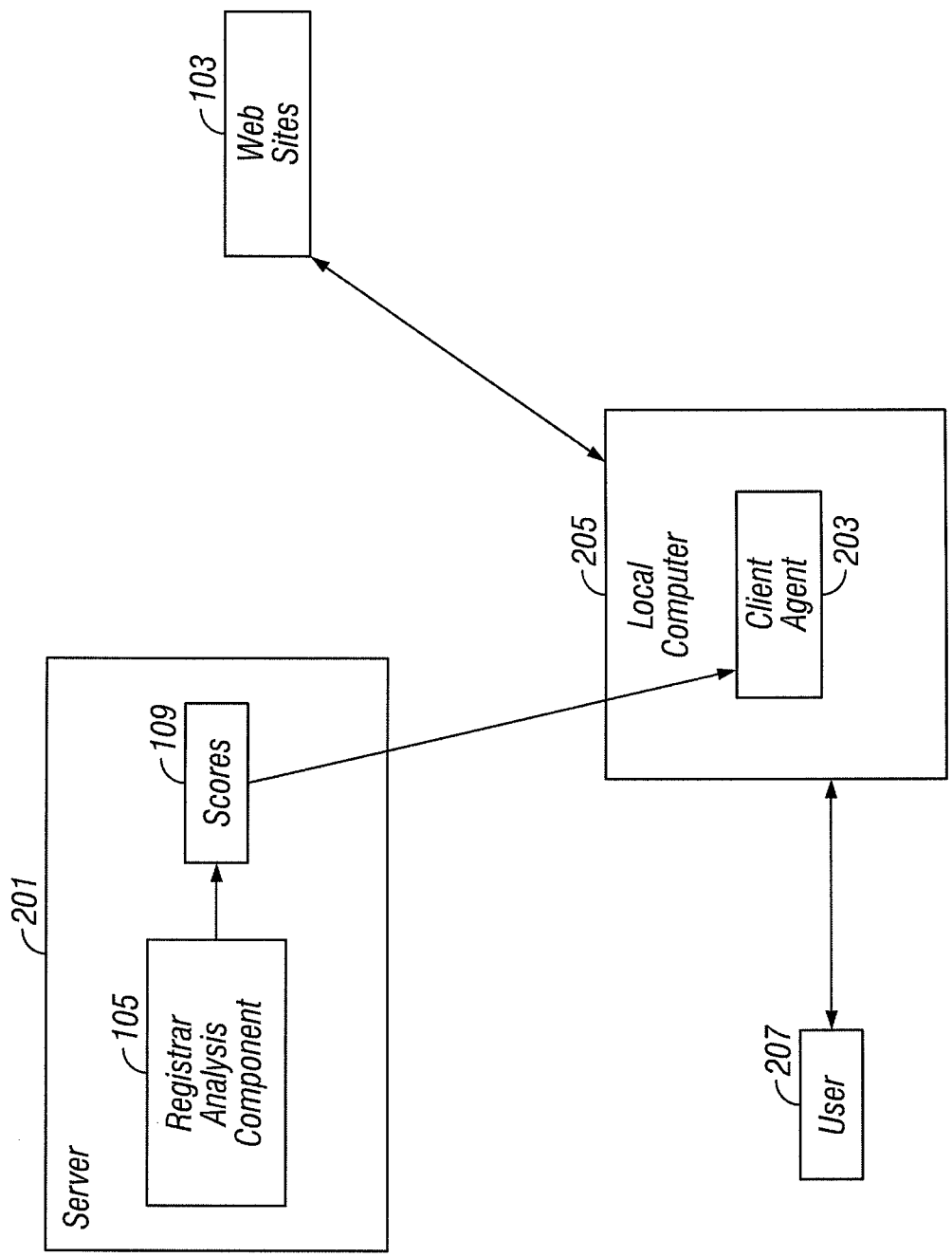
FIG. 2 is a block diagram illustrating using the reputation of a domain registrar to provide guidance as to what level of security analysis to apply to interactions with a hosted domain, according to some embodiments of the present invention.

Turning now to FIG. 2, the registrar analysis component 105, which is typically centrally located, for example on a server 201, makes the reputational scores 109 of the various domain registrars 101 available to client agents 203 running on local user computers 205 (only one such local computer 205 is illustrated). When a user 207 attempts to access a website 103 the client agent 203 evaluates the reputational score 109 of the registrar 101 that hosts the target domain 103, in order to determine what level of protection or guidance is appropriate to apply to the access attempt. In some embodiments, this evaluation is only made when a user 207 attempts to access a site 103 that he has not previously accessed, and/or is not on a list of known safe sites 103. In any case, the greater the risk factor indicated for the registrar 101, the more likely that the domain 103 itself is fraudulent or the like, and thus more robust (and expensive) measures are typically applied in the corresponding security analysis of the site 103.

Where the registrar 101 hosting an unknown domain 103 that the user 207 is attempting to access has a score 109 indicating high risk, the client agent 203 might employ more expensive scanning of the site 103 for malicious code, may introduce more latency while a honeyclient probes the site 103, or may provide more disruptive guidance to the user 207, in the form of warnings and such. It is to be understood that the score 109 of the registrar 101 is just one factor that can be taken into account when determining how much security analysis to apply to a target site 103. The registrar's score 109 can be combined with, for example, information indicating the riskiness of the site 103 itself, using any weighting factors as desired. It is to be further understood that what specific security analysis methods to apply to given domains 103 under which circumstances is a variable design parameter. The above described methodologies enable robust domain 103 risk assessment by using the reputational score 109 of the registrar 101 as a factor. Client agents 203 and other security components can respond to this risk assessment as deemed appropriate.

Wide usage of the above described methodologies should have the effect of creating an environment in which some domain registrars 101 are rated as being more trusted than others. If a domain publisher wants its users to experience faster and smoother interaction, it will use a highly trusted registrar 101 to host its domains 103.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A machine implemented method for calculating reputational scores concerning domain registrars, the method comprising the steps of:
   maintaining, by a computer, reputational scores for a plurality of domain registrars;
   maintaining, by a computer, a list of known undesirable domains;
   for each undesirable domain on the list, determining, by a computer, a domain registrar that hosts that domain;
   adjusting, by a computer, a reputational score concerning that domain registrar based on the hosting of the undesirable domain, the reputational score based on an evaluation of a registration process and an average risk of all domains of the domain registrar;
   making, by a computer, reputational scores concerning domain registrars available to at least one party that accesses domains;
   detecting, by a computer, an attempt by a user to access external sites;
   responsive to the detecting step, examining, by a computer, a reputational score concerning a domain registrar hosting an external site the user is attempting to access; and
   utilizing, by a computer, the reputational score concerning the domain registrar as at least one factor in determining at least one security step to apply to the access attempt, the at least one security step being more stringent for a first access of an external site than for a non-first access.

2. The method of claim 1 wherein maintaining a list of known undesirable domains further comprises getting information concerning at least one known undesirable domain from at least one source from a group of sources consisting of:
   at least one blacklist;
   spam detection software;
   phishing detection software;
   security software; and
   an identification of at least one domain name with at least one typo variant.

3. The method of claim 1 wherein maintaining a list of known undesirable domains further comprises maintaining a list of domains comprising at least one domain of at least one domain type from a group of domain types consisting of:

phishing domains;
spam domains;
domains hosting malware;
suspicious domains;
risky domains;
fraudulent domains; and
domains hosting advertisements.

4. The method of claim 1 wherein maintaining a list of known undesirable domains further comprises:
 periodically updating the list in real time.

5. The method of claim 1 wherein maintaining reputational scores for a plurality of domain registrars further comprises:
 initially assigning a domain registrar a neutral score.

6. The method of claim 1 wherein adjusting a reputational score concerning a domain registrar based on the hosting of an undesirable domain further comprises:
 adjusting the reputational score concerning the domain registrar based on a risk level of the hosted undesirable domain.

7. The method of claim 1 further comprising:
 adjusting at least one reputational score concerning at least one domain registrar according to at least one weighting factor.

8. The method of claim 7 wherein adjusting at least one reputational score concerning at least one domain registrar according to at least one weighting factor further comprises utilizing at least one weighting factor from a group of weighting factors consisting of:
 a percentage of risky domains as a total of hosted domains;
 an evaluation of a used registration process; and
 a sample size.

9. At least one non-transitory computer readable medium containing a computer program product for calculating reputational scores concerning domain registrars, the computer program product, when executed by a processor, performing a method comprising:
 maintaining reputational scores for a plurality of domain registrars;
 maintaining a list of known undesirable domains;
 for each undesirable domain on the list, determining a domain registrar that hosts that domain;
 adjusting a reputational score concerning that domain registrar based on the hosting of the undesirable domain, the reputational score based on an evaluation of a registration process and an average risk of all domains of the domain registrar;
 making reputational scores concerning domain registrars available to at least one party that accesses domains;
 detecting an attempt by a user to access external sites;
 responsive to the detecting step, examining a reputational score concerning a domain registrar hosting an external site the user is attempting to access;
 utilizing the reputational score concerning the domain registrar as at least one factor in determining at least one security step to apply to the access attempt, the at least one security step being more stringent for a first access of an external site than for a non-first access.

10. The computer program product of claim 9 wherein the maintaining a list of known undesirable domains further comprises getting information concerning at least one known undesirable domain from at least one source from a group of sources consisting of:
 at least one blacklist;
 spam detection software;
 phishing detection software;
 security software; and
 an identification of at least one domain name with at least one typo variant.

11. The computer program product of claim 9 wherein the maintaining a list of known undesirable domains further comprises maintaining a list of domains comprising at least one domain of at least one domain type from a group of domain types consisting of:
 phishing domains;
 spam domains;
 domains hosting malware;
 suspicious domains;
 risky domains;
 fraudulent domains; and
 domains hosting advertisements.

12. The computer program product of claim 9 wherein the maintaining a list of known undesirable domains further comprises:
 periodically updating the list in real time.

13. The computer program product of claim 9 wherein the maintaining reputational scores for a plurality of domain registrars further comprises:
 initially assigning a domain registrar a neutral score.

14. The computer program product of claim 9 wherein the adjusting a reputational score concerning a domain registrar based on the hosting of an undesirable domain further comprises:
 adjusting the reputational score concerning the domain registrar based on a risk level of the hosted undesirable domain.

15. The computer program product of claim 14 wherein the adjusting the reputational score concerning the domain registrar based on a risk level of the hosted undesirable domain further comprises:
 assigning undesirable domains risk levels.

16. The computer program product of claim 9 further comprising:
 adjusting at least one reputational score concerning at least one domain registrar according to at least one weighting factor.

17. The computer program product of claim 16 wherein the adjusting at least one reputational score concerning at least one domain registrar according to at least one weighting factor further comprises utilizing at least one weighting factor from a group of weighting factors consisting of:
 a percentage of risky domains as a total of hosted domains;
 an evaluation of a used registration process; and
 a sample size.

* * * * *